(12) United States Patent
Seyhan et al.

(10) Patent No.: US 10,185,927 B1
(45) Date of Patent: Jan. 22, 2019

(54) TECHNIQUES FOR OPTIMIZING AN INVENTORY SELECTION

(71) Applicant: Amazon Technologies, Inc., Seattle, WA (US)

(72) Inventors: Tolga Han Seyhan, Seattle, WA (US); Ali Sadighian, Seattle, WA (US); Salal Humair, Sammamish, WA (US); Jialei Rong, Bellevue, WA (US); Haiyun Wang, Seattle, WA (US); Deepak Bhatia, Issaquah, WA (US); Zhihao Chen, Ann Arbor, MI (US); Abid Kapadya, Seattle, WA (US); Julie Wei-Shu Chang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 14/973,487

(22) Filed: Dec. 17, 2015

(51) Int. Cl.
  *G06Q 10/08* (2012.01)
  *G06Q 30/02* (2012.01)

(52) U.S. Cl.
  CPC ....... *G06Q 10/087* (2013.01); *G06Q 30/0205* (2013.01)

(58) Field of Classification Search
  CPC .......................... G06Q 10/087; G06Q 20/203
  USPC ............. 705/28, 22, 7.33, 26.2, 26.41, 27.1; 235/383, 380
  See application file for complete search history.

(56) References Cited

U.S. PATENT DOCUMENTS

| | | | | |
|---|---|---|---|---|
| 6,341,269 | B1 * | 1/2002 | Dulaney | G06Q 10/087 705/22 |
| 7,610,219 | B2 * | 10/2009 | Sayed | G06F 17/248 705/26.2 |
| 7,797,205 | B2 * | 9/2010 | Song | G06Q 10/04 705/28 |
| 9,189,768 | B2 * | 11/2015 | Plaster | G06Q 30/06 |
| 2001/0047293 | A1 * | 11/2001 | Waller | G06Q 10/087 705/22 |
| 2006/0173759 | A1 * | 8/2006 | Green | G06Q 10/00 705/35 |
| 2007/0050235 | A1 * | 3/2007 | Ouimet | G06Q 10/06375 705/7.31 |
| 2009/0119144 | A1 * | 5/2009 | Goyal | G06Q 10/06 705/7.12 |
| 2011/0130857 | A1 * | 6/2011 | Budiman | G05B 19/41875 700/104 |
| 2011/0173034 | A1 * | 7/2011 | Riepshoff | G06Q 10/00 705/7.11 |

(Continued)

*Primary Examiner* — Vanel Frenel
(74) *Attorney, Agent, or Firm* — Kilpatrick Townsend & Stockton LLP

(57) ABSTRACT

Techniques are provided herein for utilizing an inventory engine to optimize the selection of a set of items to be stored as inventory at a storage location. A candidate set of items may be identified based at least in part on a selection model. In accordance with at least one embodiment, the selection model may be based at least in part on a capacity of the storage location and a threshold time duration by which purchased items of the set of items are to be transported from the storage location to a purchaser. A plurality of probability values corresponding to the candidate set of items may be determined. An optimal set of items may be determined based at least in part on the candidate set of items and the plurality of probability values.

20 Claims, 8 Drawing Sheets

(56) References Cited

U.S. PATENT DOCUMENTS

2013/0080183 A1* 3/2013 Bond .................... G06Q 10/08
                                                    705/2
2015/0100433 A1* 4/2015 Choy ................ G06Q 30/0269
                                                    705/14.69

* cited by examiner

TECHNIQUES FOR OPTIMIZING AN INVENTORY SELECTION

BACKGROUND

Electronic marketplaces are currently beginning to surpass physical stores in overall throughput. However, a challenge still realized by electronic marketplace providers relates to selecting an optimal inventory for storage locations with limited capacity or other storage constraints. Providing items purchased online presents many challenges with respect to accurately predicting consumer demand. Currently, electronic marketplace providers stock warehouses according to national demand forecasts. These forecasts fail to provide accurate estimations for smaller geographical areas (e.g., a geographical area serviced by a warehouse). Suboptimal inventory selection can lead to decreased revenue and/or delays in the delivery time needed to provide an item to a purchaser. For example, if an item is unavailable or delivery of the item is significantly delayed, a consumer may decide to purchase the item via a physical store rather than from the electronic marketplace. By optimizing the inventory selection process, electronic marketplace providers can reduce wasteful storage and increase throughput which, in turn, may lead to increased revenue and customer satisfaction.

BRIEF DESCRIPTION OF THE DRAWINGS

Various embodiments in accordance with the present disclosure will be described with reference to the drawings, in which.

DETAILED DESCRIPTION

Figure 1:
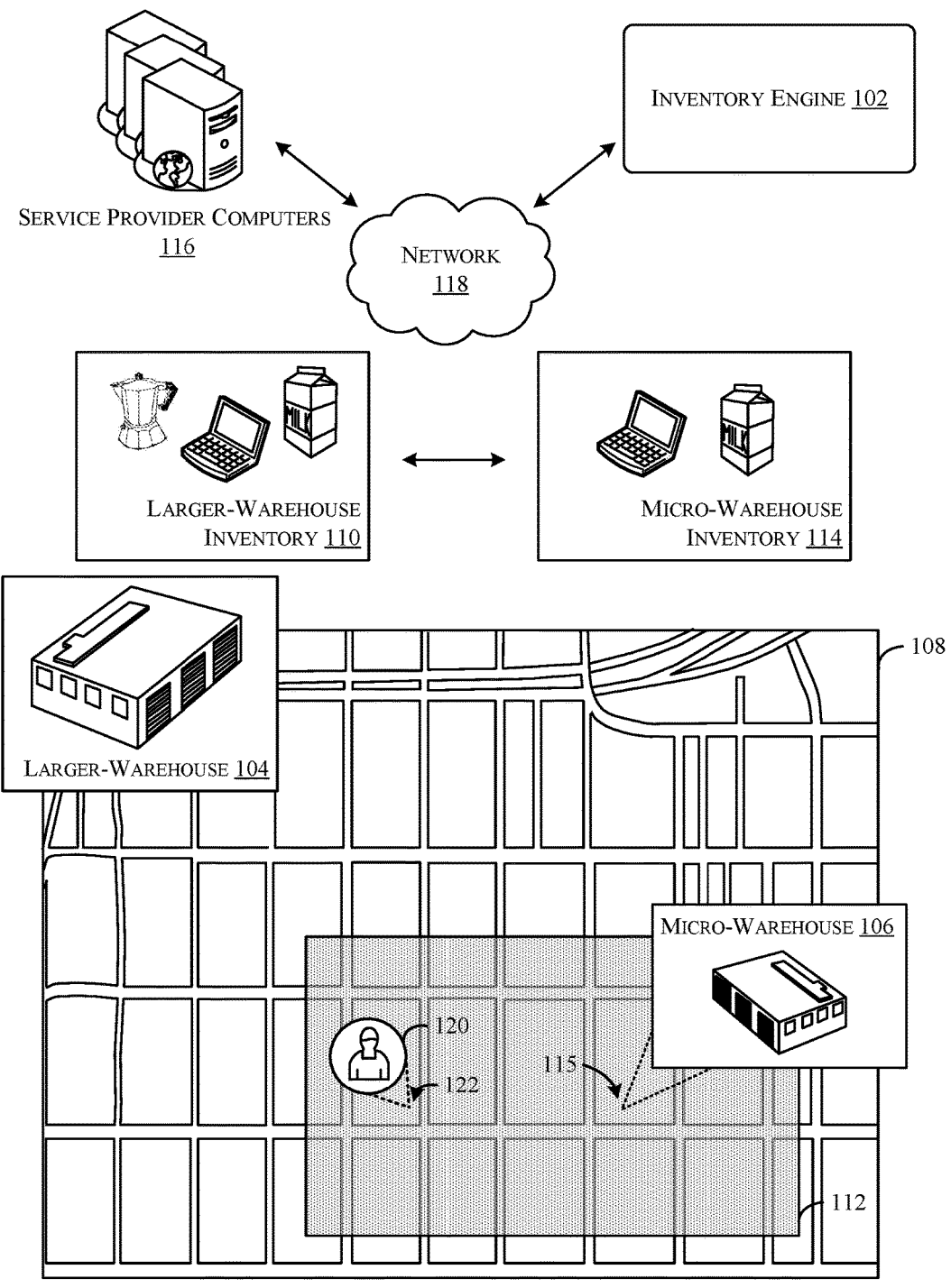
FIG. 1 is a schematic diagram illustrating an example environment suitable for implementing aspects of an inventory engine, in accordance with at least one embodiment.

Techniques described herein are directed to generating an optimal inventory of items for a storage location utilizing an inventory engine. Examples of an "optimal inventory," may include, but is not limited to, a combination of items for which the predicted unit throughput for the items is optimized (e.g., maximized). An example electronic marketplace may include a computer-facilitated market for participants (e.g., buyers and sellers) to conduct transactions including commercial and/or financial transactions. Examples of an "item" include, but are not limited to a product, a service, a sellable unit, or anything else that may be managed or otherwise physically or electronically stored as inventory. An example "inventory-selection model" may describe the behavior of an inventory-selection system and/or process in mathematical terms.

A "micro-warehouse," as used herein, is intended to include a limited-capacity warehouse that is part of a network of warehouses operated by a provider (e.g., an electronic marketplace provider). The network of warehouses may include any suitable number of larger warehouses that individually service a geographical region, and any suitable number of micro-warehouses that individually service a smaller geographical area that may, or may not be included in a geographical region serviced by a larger warehouses. The location of a micro-warehouse may be associated with higher real estate costs than the real estate costs associated with a location of a larger warehouse. Accordingly, the cost of storing an item in the micro-warehouse may be considerably higher than storing the same item in the larger warehouse. The micro-warehouse may contain less storage space than that of a larger warehouse. Additionally, the smaller area serviced by the micro-warehouse may include a population of people equal to or larger than a population included in a larger area serviced by the larger warehouse.

In a non-limiting example, a provider (e.g., an electronic marketplace provider) may offer a number of items for consumption (e.g., via an electronic catalog). It may be desirable to store a subset of items from the catalog at a particular storage location (e.g., a micro-warehouse). that services a particular geographic area (e.g., a city, a zip-code, an area defined by a number of city blocks, etc.). These items may initially be housed in other warehouses that service larger areas (e.g., counties, multiple zip-codes, etc.) or may be collocated with one or more vendors. The inventory engine may be utilized to determine an optimized inventory for the micro-warehouse to include items that are capable of being transported to a purchaser within a relatively short duration of time (e.g., within 0.5, 1, or 2 hours of purchase). The inventory engine may obtain national demand forecast data utilized by the provider to make national inventory decisions. This national demand forecast data may correspond to a larger area serviced by network of warehouses and may not specifically correspond to the geographic area serviced by the micro-warehouse. The inventory engine may generate a regional demand forecast for the geographic area serviced by the micro-warehouse using the national forecast data. The inventory engine may determine a set of candidate items using the regional demand forecast. The inventory engine can enforce a number of overrides (e.g., predetermined or user-specified) that enable an item to be included in or excluded from the set of candidate items regardless of the forecasted demand for the item. The inventory engine may identify an optimal inventory for the micro-warehouse from the candidate items and may score the candidate items according to a demand associated with respective items of the candidate items. Additionally, or alternatively, the inventory engine may cause the candidate items to be scored according to a number of factors including, but not limited to, identification of a substitution item, identification of a complementary item, and/or identification of a competitor-offered item. The inventory engine may be configured to select an optimal inventory according to the score (e.g., a top number of scored items). The inventory engine may cause the optimal inventory to be adjusted utilizing additional demand data. In some cases, the additional demand data may relate to the micro-warehouse or other micro-warehouses of a network of warehouses.

In at least one embodiment, a "substitution" item is intended to refer to an item that may be substituted for one or more other items. As a non-limiting example, a consumer may purchase a substitute item (e.g., brand A milk) in lieu of another item (e.g., brand B milk) because the items share one or more common attributes (e.g., both items are organic, include 2% milkfat, and utilize ½ gallon containers) and/or the substitute item was available for purchase while the other item was not (e.g., out of stock). A "complementary item" is intended to refer to a first item that, when included in the inventory, will increase the potential sales of another item by a threshold amount. For example, sales for flour may potentially be increased when milk and egg products are also available because the combination of these items can be utilized for a common purpose (e.g., to bake a cake). A "competitor-offered item" is intended to refer to an item that is offered by a third-party provider. In some examples, an inventory-selection model may factor in information related to any suitable combination of substitution items, complementary items, and/or competitor-offered items when generating a score for an item.

The techniques disclosed herein, address, at least, an internet-centric challenge of providing items purchased (and/or leased) from an electronic marketplace to a purchaser within a shortened delivery time, enabling the electronic marketplace provider to compete with local merchants. Currently, it is difficult for electronic marketplace providers to compete with physical stores who can offer a purchaser the instant gratification of leaving with an item upon purchase. Thus, with the increase of online shoppers, comes increased pressure for providers to offer items purchased online within an expedited delivery time. Relatively short delivery times present challenges for the provider with respect to determining where to store high-demand items to enable such delivery, while minimizing the cost of storing such items. The techniques discussed herein are directed to providing solutions to these challenges.

FIG. 1 is a schematic diagram illustrating an example environment 100 suitable for implementing aspects of an inventory engine 102, in accordance with at least one embodiment. In at least one example, an electronic marketplace provider may operate a network of warehouses including, but not limited, to a larger-warehouse 104 and a micro-warehouse 106. In the example depicted in FIG. 1, the larger-warehouse 104 services a geographical area 108, and is associated with a larger-warehouse inventory 110. The larger-warehouse 104 may be located within the geographical area 108 or outside the geographical area 108. The micro-warehouse 106 of FIG. 1 services the geographical area 112 and is associated with the micro-warehouse inventory 114. The micro-warehouse 106 may be located outside the geographical area 112 or within the geographical area 112, for example, at location 115. In at least one example, the location 115 may be associated with higher real-estate costs, on average, than the real-estate costs of the location of the larger-warehouse 104 (not depicted). The micro-warehouse 106 may provide less overall storage space than the larger-warehouse 104 (e.g., 1, 2, or 3 orders of magnitude less storage). Therefore, in some cases, storing an item in the micro-warehouse 106 may be more costly than storing the same item in the larger-warehouse 104. In some cases, the micro-warehouse inventory 114 may include items that are subject to a delivery constraint that requires the item to be transported to a purchaser within a threshold period of time (e.g., within 0.5, 1 or 2 hours from purchase). The larger-warehouse inventory 110 may include items that are not subject to the same delivery constraint.

In at least one example, the service provider computers 116 may host one or more network pages associated with an electronic marketplace operated by an electronic marketplace provider. Additionally, the service provider computers 116 may maintain information regarding an inventory of items (e.g., including the larger-warehouse inventory 110 and the micro-warehouse inventory 114) offered for consumption via the one or more network pages.

In at least one embodiment, the inventory engine 102 may communicate with the service provider computers 116 via network 118 in order to obtain information regarding the inventory of items provided by the electronic marketplace provider. Network 118, and any network described herein, can include any appropriate network, including an intranet, the Internet, a cellular network, a local area network, a wide area network, or any other such network or combination thereof. The communication may be transmitted electronically or physically communicated over, for example, a telephone (e.g., using an automated service). The information regarding the inventory of items may include, but is not limited to, a demand data for one or more items (e.g., demand forecast data indicating a number of predicted sales for an item related to a given time period), an attribute of one or more items (e.g., weight, dimensions, a storage requirement for the item related to an item attribute (e.g., perishable item), etc.), or a business constraint (e.g., a rule specifying a storage requirement related to a business purpose, for example, that only non-hazardous materials are stored within the micro-warehouse 106).

Utilizing the information obtained from the service provider computers 116, the inventory engine 102 may determine an optimal set of items for micro-warehouse inventory 114. For example, the inventory engine 102 may obtain an inventory of items corresponding to a portion of items offered by the electronic marketplace provider. In some cases, the inventory of items may include items that may be obtained from one or more third-party vendors. In at least one example, the inventory engine 102 may include or exclude items in inventory from being considered for storage within the micro-warehouse 106. An item that is bigger than a threshold size, or over a threshold weight, or contains a hazardous material, may be excluded from consideration, for example. The inventory engine 102 may further utilize predetermined overrides and/or user-specified overrides to determine whether to include or exclude an item from consideration.

In at least one example, the inventory engine 102 may obtain demand forecast information related to a geographical area serviced by the network of warehouses (e.g., a national forecast). The inventory engine 102 may utilize the demand forecast information to generate a regional demand forecast for predicting item demand within the geographical area 112. The inventory engine 102 may utilize the regional demand forecast to determine an optimal set of items to be stored in the micro-warehouse 106. Upon determining the optimal set of items, the inventory engine 102 may execute one or more workflows in order to cause the optimal set of items to be transported and stored at the micro-warehouse 106. The service provider computers 116 may be configured to provide the items stored at the micro-warehouse 106 on one or more network pages, in some cases, with an indication that the items are available for delivery within a threshold period of time.

In at least one embodiment, a user 120 of the electronic marketplace may navigate to a network page that offers an item stored at the micro-warehouse 106. The user 120 may be located within geographical area 112, for example, at location 122. Upon completing a purchase transaction, the purchased item may be provided to the user 120 within the indicated threshold period of time.

Figure 2:
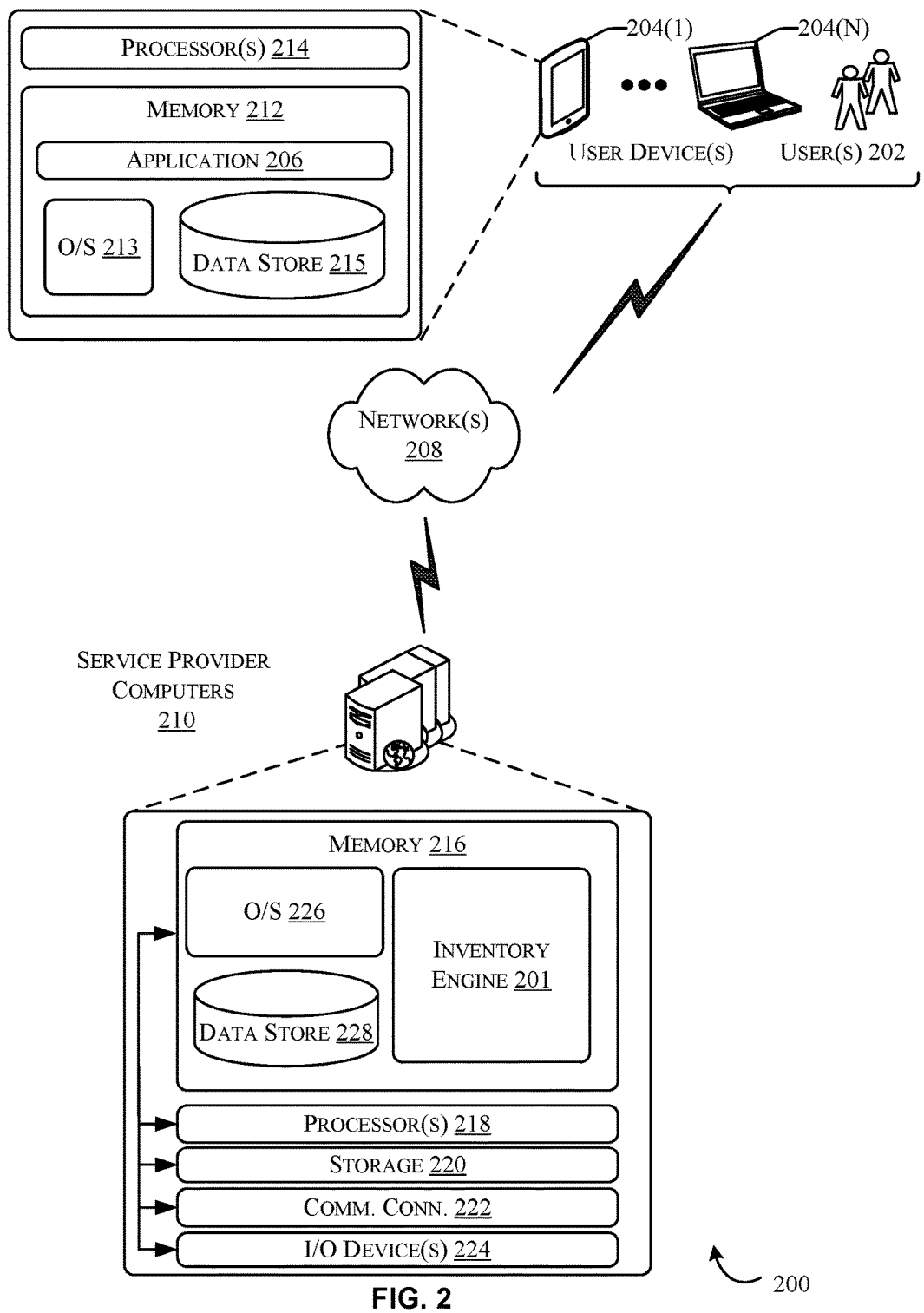
FIG. 2 is an example architecture of the inventory engine, in accordance with at least one embodiment.

FIG. 2 is an example architecture 200 of an inventory engine 201 (e.g., the inventory engine 102 of FIG. 1), in accordance with at least one embodiment. In architecture 200, one or more users 202 (e.g., the user 120 of FIG. 1) may utilize user computing devices 204(1)-(N) (collectively, user computing devices 204) to access an application 206 (e.g., an application operating on a mobile device, a web browser, etc.) or a user interface accessible through the application 206 via one or more networks 208 (e.g., the network 118 of FIG. 1). In some aspects, the application 206 may be hosted, managed, and/or provided by a computing resources service or service provider, such as by utilizing one or more service provider computers 210 (the service provider computers 116 of FIG. 1).

In some examples, the networks 208 may include any one or a combination of many different types of networks, such as cable networks, the Internet, wireless networks, cellular networks, and other private and/or public networks. While the illustrated example represents the users 202 accessing the application 206 over the networks 208, the described techniques may equally apply in instances where the users 202 interact with the service provider computers 210 via the one or more user computing devices 204 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 206 may allow the users 202 to interact with the service provider computers 210 such as to browse for items offered by an electronic marketplace utilizing the application 206. The service provider computers 210, perhaps arranged in a cluster of servers or as a server farm, may host the application 206 and/or cloud-based software services. Other server architectures may also be used to host the application 206 and/or cloud-based software services. The application 206 may be capable of handling requests from the users 202 and serving, in response, various user interfaces that can be rendered at the user computing devices 204. The application 206 can present any suitable type of website that supports user interaction, including search engine sites. The described techniques can similarly be implemented outside of the application 206, such as with other applications running on the user computing devices 204.

The user computing devices 204 may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 204 may be in communication with the service provider computers 210 via the networks 208, or via other network connections.

In one illustrative configuration, the user computing devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. The memory 212 may include an operating system 214, one or more data stores 215, and/or one or more application programs, modules, or services for implementing the features disclosed herein including one or more features of the inventory engine 201. Depending on the configuration and type of user computing device, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein, such as via the application 206 (e.g., a web browser). The application 206 may be configured to receive, store, and/or display a network page or other interface for interacting with the service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 210 may be in communication with the user computing devices 204 and/or other service providers via the networks 208 or via other network connections. The service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein.

Figure 3:
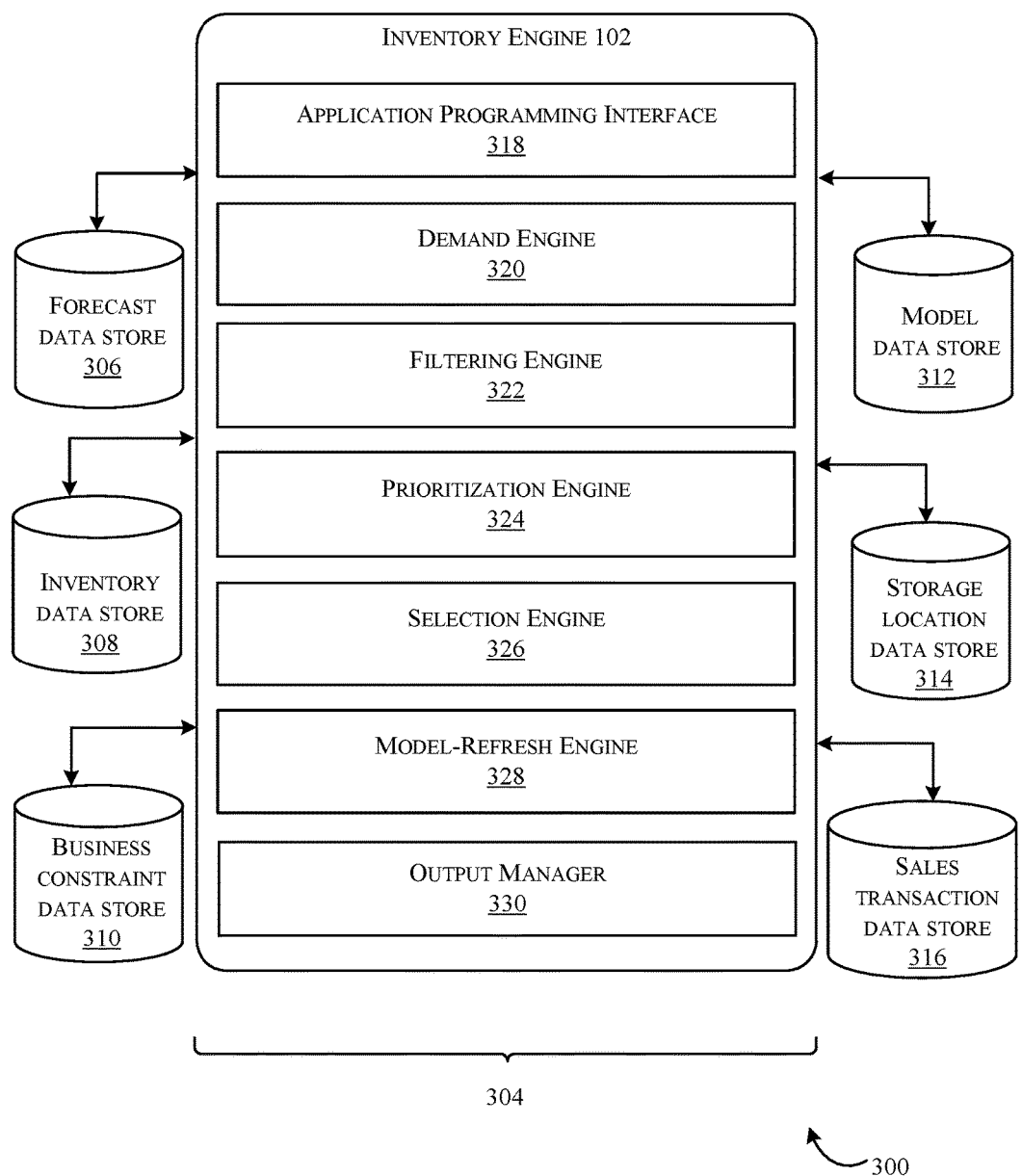
FIG. 3 is a schematic diagram of an example computer architecture for the inventory engine, including a plurality of modules that may carry out various embodiments.

FIG. 3 schematically illustrates an example computer architecture 300 for the inventory engine 102 of FIG. 1, including a plurality of modules 304 that may carry out various embodiments. The modules 304 may be software modules, hardware modules, or a combination thereof. If the modules 304 are software modules, the modules 304 can be embodied on a computer readable medium and processed by a processor in any of the computer systems described herein. It should be noted that any module or data store described herein, may be, in some embodiments, a service responsible for managing data of the type required to make corresponding calculations. The modules 304 may be configured in the manner suggested in FIG. 3 or the modules 304 may exist as separate modules or services external to the inventory engine 102. For example, any combination of modules 304 may be executed, in whole or in part, on the service provider computers 116 of FIG. 1. Likewise, any combination of modules 304 may be executed, in whole or in part, on the user computing devices 204 of FIG. 2, for example, as part of the application 206 of FIG. 2.

In the embodiment shown in the drawings, a forecast data store 306, an inventory data store 308, a business constraint data store 310, a model data store 312, a storage location data store 314, and a sales transaction data store 316 are shown, although data can be maintained, derived, or otherwise accessed from various data stores, either remote or local to the inventory engine 102, to achieve the functions described herein. The inventory engine 102, as shown in FIG. 3, includes various modules such as an application programming interface 318, a demand engine 320, a filtering engine 322, a prioritization engine 324, a selection engine 326, a model-refresh engine 328, and an output manager 330. Some functions of the modules 318, 320, 322, 324, 326, 328, and 330 are described below. However, for the benefit of the reader, a brief, non-limiting description of each of the modules is provided in the following paragraphs.

In accordance with at least one embodiment, a process is enabled for determining an optimal set of items to store in a storage location (e.g., the micro-warehouse 106 of FIG. 1) utilizing the inventory engine 102 of FIG. 1. Input may be received via the application programming interface 318 (e.g., a request to determine an inventory for the micro-warehouse 106). In at least some examples, the request may specify a storage location identifier and a start date associated with a date by which the storage location will begin provided a set of items to purchasers. The application programming interface 318 may be utilized in any suitable example as a mechanism for receiving and/or transmitting data to and/or from the inventory engine 102.

In accordance with at least one embodiment, the demand engine 320, a component of the inventory engine 102, may obtain demand forecast information related to a set of items. For example, the demand engine 320 may utilize the received start date and the storage location identifier to determine forecast data associated with a set of candidate items (e.g., all available items stored in inventory). For example, a set of candidate items may be obtained from the inventory data store 308, a storage location configured to store information corresponding to an inventory provided by an electronic marketplace provider. The inventory may include one or more inventories that are individually associated with various warehouses (e.g., larger warehouses and/or micro-warehouses) of a network of warehouses operated by the electronic marketplace provider.

Upon obtaining the set of candidate items, the demand engine may obtain forecast information for the set of candidate items, for example, from forecast data store 306, a storage location configured to store forecasting information. "Forecast information" is intended to refer to demand data corresponding to a predicted number of sales associated with a particular item or items within a particular time period. For example, forecast information might indicate that 30,000 pairs of brand A, size 10, red sneakers, manufactured by Acme, will be sold during the month of November of a particular year. In at least one example, the forecast information obtained by the demand engine 320 may include forecast information for items previously offered from the storage location associated with the storage location identifier (e.g., a particular micro-warehouse) and/or from a similar storage location (e.g., other micro-warehouses). In some cases, if forecast information for the storage location or a similar storage location is unavailable, the demand engine 320 may obtain forecast information such as a national forecast.

In accordance with at least one embodiment, the demand engine 320 may generate a regional demand forecast utilizing a national forecast. In at least one example, the national forecast may not accurately reflect the size of an area service by a micro-warehouse. Thus, the demand engine 320 may be configured to scale the national forecast down to provide predicted sales values for items that may be offered in a geographical area serviced by the storage location (e.g., a regional demand forecast). In a non-limiting example, the demand engine 320 may determine that the national forecast covers a geographical area that is approximately 10,000 times larger than the area serviced by the storage location. Accordingly, the demand engine 320 may reduce the predicted sales values from the national forecast by a factor of 10,000 in order to ascertain predicted sales values that will more accurately correspond to the geographical area serviced by the storage location.

In accordance with at least one embodiment, the demand engine 320 may utilize past-purchase information from the electronic marketplace in order to determine demand for an item. For example, past-purchase information may be obtained by the demand engine 320 from the sales transaction data store 316, a data store configured to store such information. The past-purchase information may indicate that one or more users incurred greater shipping fees in order to obtain a particular item quicker than a standard delivery time period. The demand engine 320 may utilize such information in order to indicate that such items may have a higher demand when provided by the storage location than items for which purchasers did not incur higher shipping fees. In at least one example, the demand engine 320 may utilize past-purchase information associated with a particular storage location (e.g., the micro-warehouse) or a similar storage location (e.g., another micro-warehouse) to adjust demand values included in the regional demand forecast.

In accordance with at least one embodiment, a filtering engine 322, a component of the inventory engine 102, may be configured to include and/or or exclude one or more items from a storage location's inventory. For example, the filtering engine 322 may obtain a predetermined or user-specified list (e.g., an inclusion list) indicating items that will be included in the storage location's inventory regardless of any other considerations discussed herein including demand forecast data. Likewise, the filtering engine 322 may obtain a predetermined or user-specified list (e.g., an exclusion list) indicating items that will be excluded from the storage location's inventory regardless of any other considerations discussed herein including demand forecast data. In at least one example, the filtering engine 322 may derive at least a portion of an inclusion and/or exclusion list by utilizing past-purchase information (e.g., obtained from sales transaction data store 316). For example, the filtering engine 322 may determine an item to be added to an inclusion list by determining that the item has been offered over a threshold period of time (e.g., over 90 consecutive days), has been purchased over a threshold amount, consistently (e.g., each month), within that threshold period of time (e.g., the previous six-month period). At any suitable time, for example, if and when the item falls below the threshold amount, the filtering engine 322 may remove the item from the inclusion list. Similarly, the filtering engine 322 may utilize past-purchase information to determine an item is to be added to an exclusion list. The filtering engine 322 may determine that an item is to be excluded when the item has been available at the storage location or a similar storage location (e.g., another micro-warehouse) for a threshold period of time (e.g., 90 days), and that, despite the availability of the item, the item was not purchased, or was not purchased over a threshold amount, within the threshold period of time. Items included in an inclusion list and/or an exclusion list may be included or excluded at any suitable time within the examples discussed herein.

In accordance with at least one embodiment, a prioritization engine 324, a component of the inventory engine 102, may be configured to assigned a prioritization value to one or more items of the set of candidate items. The prioritization value is intended to bias inventory selection. The prioritization engine 324 may utilize past-purchase information to determine whether an item is producing over a threshold number of sales, consistently (e.g., each month), over a threshold period of time. These items may be assigned a priority that corresponds to the sales number. For example, an item that is consistently purchased 100 times a month for the last six months may be assigned a higher priority than an item that is consistently purchased 50 times a month for the same period. As more purchase information is collected over time, the prioritization engine 324 may be configured to adjust priority assignments accordingly.

In accordance with at least one embodiment, the selection engine 326 may be configured to generate and/or execute one or more algorithms/formulas of an inventory-selection model described herein. The selection engine 326 may obtain demand forecast data (e.g., from demand engine 320) for a set of candidate items (e.g., available items in inventory) as well as any priority assignment values associated with individual items of the set of candidate items. In at least one example, execution of the algorithms/formulas of the inventory-selection model may cause the set of candidate items to be scored according to a number of factors. In at least one embodiment, item selection may be represented in the inventory-selection model according to the following formula:

$$\max \sum_{i \in A} r_i d_i y_i \qquad (1)$$

$$\text{s.t.} \sum_{i \in A} y_i \leq M \qquad (2)$$

$$y_i \in \{0, 1\} i \in A \qquad (3)$$

where A includes the set of candidate items, where (at most) M items are to be selected with the objective of maximizing the total unit sales of the selected items. Each item $i \in A$ may be associated with a deterministic customer demand $d_i$ over a predetermined period of time (e.g., next month) to result in a profit of $r_i$ per item unit. In at least some examples, a sales objective is equivalent to $r_i$ for each item i. $y_i$ may represent a decision variable, which in some cases, may include a binary selection decision for a particular item i. In at least one embodiment, execution by the selection engine 326 of the formula above may cause the set of candidate items to be ranked in descending order ($r_i d_i$) and a top number of items corresponding to M to be selected.

In accordance with at least one embodiment, the inventory-selection model may consider one or more storage constraints of the storage location. The selection engine 326 may obtain storage location constraint information associated with the identified storage location from the storage location data store 314, a data store configured to store such information. The storage location data store 314 may store constraint information in a profile, or other association related to a particular storage location. In some examples, the storage constraint may correspond to a maximum storage capacity corresponding to a total number of items capable of being stored in the storage location, however other storage constraints may be considered. For example, a particular storage location may not include a refrigerator section, thus a storage constraint may be associated with the storage location that specifies that items that need refrigeration are not to be stored at the storage location. In another example, a storage constraint may be associated with a period of time by which items offered by the storage location must be transported and provided to the purchaser. Accordingly, a storage constraint may specify that items that may not be transported and provided by the specified period of time, may not be stored at the storage location. In at least one example, a storage constraint may be represented in the inventory-selection model according to the following formula:

$$\sum_{i \in G} v_i n d_i y_i \le V_G \ \forall \ G \in A \quad (4)$$

where an item i occupies a volume $v_i$. In at least one example, n corresponds to a number of time periods worth of inventory, thus $nd_i$ a number of units for an item i for some number of time periods worth of inventory n≥0. In at least one example, various storage constraints for different product types G (e.g., fresh produce, chilled/frozen, apparel) may be considered.

In accordance with at least one embodiment, the inventory-selection model executed by the selection engine 326 may consider business constraints of the warehouse. For example, the selection engine 326 322 may obtain one or more business constraints associated with the electronic marketplace provider from the business constraint data store 310, a data store configured to store such information. A "business constraint" may include one or more rules that specify when an item should be included or excluded from an inventory associated with a storage location. A business constraint may identify an essential item (e.g., an item manufactured by the electronic marketplace provider) or a banned item (e.g., a hazardous item). Another business constraint may require that an entire subset of products must be offered, or none at all. For example, if a particular shoe is available in variety of sizes, the business constraint may specify that at least one shoe of each size must be available from the storage location or the shoe may not be stored at the storage location at all. Another business constraint may specify that a number of items of a particular category should be limited. For example, a business constraint may specify that at least on brand of cell phone charger be stored and/or that no more than two pairs of jeans for any given brand should be stored. The previously-discussed business constraints are not intended to be an exhaustive list. Any number of business constraints may be utilized that specify when an item or items are unsuitable for storage within the storage location. In at least one example, a set of business constraints may be represented in the inventory-selection model according to the following formula:

$$y_i = \begin{cases} 1, & i \in E \\ 0, & i \in B \end{cases}, \forall \ E \subseteq A, B \subseteq A \text{ and } i \in E \cup B \quad (5a)$$

$$y_{i_1} = \ldots = y_{i_{|T|}} \forall \ T \subseteq A \text{ such that } i_k \in T \text{ and } k = 1, \ldots, |T| \quad (5b)$$

$$L_G \le \sum_{i \in G} y_i \le U_G \forall \ G \in A \quad (5c)$$

where set E denotes essential products, B denotes banned products, T denotes products selected as a group and G is a generic group on which there are item-count constraints.

In accordance with at least one embodiment, the inventory-selection model may consider substitution items when determining item scores. For example, an item i may not be available for selection (e.g., the item is out of stock). Utilizing the inventory-selection model, the selection engine 326 may determine a probability that a purchaser will purchase a substitute item instead of the item i and factor this probability in when determining item scores. The selection-related substitution behavior of purchasers may be represented in the inventory-selection model according to the following formula:

$$\max \sum_{i \in A} \sum_{j \in S_i} r_j d_i p_{ij} x_{ij} \quad (6)$$

$$\text{s.t.} \sum_{j \in A} y_j \le M \quad (7)$$

$$\sum_{j \in S_i} x_{ij} \le 1 \quad i \in A \quad (8)$$

$$x_{ij} \le y_j \quad (i, j): i \in A, j \in S_i \quad (9)$$

$$\sum_{j \in S_i} p_{ij} x_{ij} \ge p_{ij} y_j \quad (i, j): i \in A, j \in S_i \quad (10)$$

Physical constraints (Eq. 4) (11)

Business constraints (Eq. $5a - 5c$) (12)

$$x_{ij} \ge 0 \quad (i, j): i \in A, j \in S_i \quad (13)$$

$$y_j \in \{0, 1\} \quad j \in A \quad (14)$$

where, for each item i∈A, a subset $S_i \subseteq A$ is defined as the set of potential substitutes for the item i. A decision variable $x_{ij}$, represents a likelihood of whether a purchaser desiring to purchase item i would consider an item j as the closest substitute. The probability of substituting j is denoted as $p_{ij}$. In at least one example, it is assumed that all purchasers have the same preference ordering of substitutes and that the item i is the best substitute for itself (i.e., $p_{ii}=1$). In at least one example, if a product j is available in the selection ($y_j=1$), it is assumed that purchasers would buy it ($x_{ij}=y_j=1$). In addition, if a purchaser of product i substitutes j ($x_{ij}=1$) the demand for j may increase by $p_{ij}d_i$. Equation (8) indicates that at most one substitute is selected. Equation (9) ensures that only selected items may qualify as substitutes. Finally, equation (10) ensures that the purchaser picks the closest-selected item as the substitute.

In accordance with at least one embodiment, the inventory-selection model may consider a complementary items when determining item scores. Continuing with the example given above with respect to baking a cake, a purchaser may desire to buy flour, milk, and eggs. If only flour and eggs are offered, a purchaser may choose to purchase all three items from another source (e.g., a grocery store). In such cases, the demand is lost for the other two items. In at least one embodiment complementarity arises when the demand for an item is conditional on the presence of another product. The complementarity of a number of items may be represented in the model according to the following formula:

$$\max \sum_{i \in A} \sum_{j \in S_i} r_j d_i p_{ij} x_{ij} - \sum_i \sum_{C: i \in C} \alpha_{iC} d_i z_{iC} \quad (15)$$

$$\text{s.t. } z_{iC} \geq y_i - \sum_{\substack{j \in C \\ j \neq i}} y_j, \forall i, C: i \in C \quad (16)$$

where a portion $\alpha_{iC}$ of an item i's (e.g., flour) demand is dependent on a purchaser buying a combination C of items (e.g., flour, milk, butter). In the absence of the combination of items in inventory (e.g., no milk), the portion $\alpha_{iC}$ is 0. Accordingly, $\alpha_{ij}=0$ if $\{i, j\} \cap C = \emptyset$ and $\alpha_{ij} > 0$ otherwise, with $\Sigma_{C:i \in C} \alpha_{iC} \leq 1$ for each i. $z_{iC} \geq 0$ represents lost demand due to combination C. In equation (16), variable $z_{iC}$ remains 0 as long as item i is not selected or there is a selected item in C, otherwise it takes the value of 1. Demand loss is enforced in the equation (15).

In accordance with at least one embodiment, the inventory-selection model may consider a competitor-offered item when determining item scores. In at least one example, if an item is not offered by the storage location, but is offered by a competitor (or the competitor provides a better substitute), then demand may be lost for the item. In at least one embodiment, the influence of competitor-offered items may be statically or dynamically modeled by the inventory-selection model. A static model may match all, or a portion, of the competitor-offered items and can be represented in the form of a business constraint as in equation (5c). Alternatively, a dynamic model may represent the competitor selection as a legitimate substitute for the product (i.e., p>0) that brings no benefit (i.e., r=0). Preference variables (e.g., p−δ, for some δ>0) may be utilized to reflect the likelihood that a purchaser still purchases the item from the electronic marketplace provider even when the competitor may be offering a slightly better substitute. In at least one example, the dynamic substitution model assumes the availability of substitution constraints, hence the item must be available (e.g., in stock) for the considered competitor item. In some cases, if the competitor has an item that is not offered by the electronic marketplace provider, the item may be required to be incorporated into the inventory of the electronic marketplace provider and a probability to be evaluated. Let $p_{i0} = \max\{p_{ij} - \delta : j \in S_i, j \text{ is offered by competitor}\}$ denote the highest substitution probability for a competitor offer. Thus, equations 8 and 10 described above and, respectively, equations 17 and 18 described below, may be revised according to the following formula:

$$\sum_{j \in S_i + \{0\}} x_{ij} \leq 1 \quad i \in A \quad (8)$$

$$\sum_{j \in S_i + \{0\}} p_{ij} x_{ij} \geq p_{ij} y_j + p_{i0} 1\{\text{competitor substitute exists}\} \quad (10)$$

$$(i, j) : i \in A, j \in S_i$$

In accordance with at least one embodiment, the inventory-selection model may utilize alternative methods to represent the substitution behavior. For example, $y_j \in \{0,1\}$ may be associated with the decision to add an item j to the selection and $x_{ij} \geq 0$ is the proportion of demand for item i that is channeled to item j. Substitution probabilities are represented by $p_{ij}$ and $d_i$ represents the demand for item i. $\beta_i \geq 0$ represents an auxiliary variable to dynamically scale $d_i$ across candidate substitutes $S_i$. Distribution is hierarchical such that if item i is in included in the selection, item i will be provided the entire demand. If item i is not included in the selection, the demand may be divided proportionally to $p_{ij}$ across candidate substitutes $j \in \{j \in S_i, j \neq i, y^*_j = 1\}$. Thus, the substation behavior may be alternatively represented in the inventory-selection model according to the following formula:

$$\beta_i p_{ij} \geq x_{ij} \geq \beta_i p_{ij} - y_i + y_j - 1 \forall i, j : j \in S_i \text{ and } j \neq i \quad (17)$$

$$x_{ij} \leq y_j, \forall i, j : j \in S_i \text{ and } j \neq i \quad (18)$$

$$x_{ii} = y_i, \forall i \quad (19)$$

$$\sum_j x_{ij} \leq 1 \quad \forall i \quad (20)$$

Equation (17) may ensure that if item i is not selected, but item j is selected, the demand distribution would be proportional to $p_{ij}$. If item i is selected then (19) and (20) ensure no other item gets any demand from item i. If item j is not selected, equation (20) sets the portion of demand item j receives from item i to zero.

In at least one embodiment, the selection engine 326 may cause the inventory-selection model to be stored, for example, in the model data store 312, a data store configured to store such information. Utilizing the inventory-selection model, the selection engine 326 may select all, or some portion of the scored items as an optimal set of items to be stored with the storage location. In at least one example, execution by the selection engine 326 of one or more algorithms/formulas of the inventory-selection model may rank the scored set of items by demand. In another example, the scored set of items may be ranked first by demand, and then by a prioritization value associated with the item (e.g., determined by the prioritization engine 324).

According to at least one embodiment, the model-refresh engine 328, a component of the inventory engine 102, may obtain additional sales information related to the storage location or other storage locations in the networks locations. Accordingly, the model-refresh engine 328 may utilize such information to adjust the inventory-selection model to take into account the additional sales information. In at least some example, additional business constraints and/or storage constraints may be utilized by the model-refresh engine 328 to further adjust the generated inventory-selection model to factor in such constraints.

According to at least one embodiment, the output manager 330, a component of the inventory engine 102, may be configured to provide the scored items and/or the optimal set of items for output. In some examples, the output manager 330 may cause the optimal set of items to be associated with the storage location (e.g., within the storage location data store 314). Additionally, or alternatively, the output manager 330 may cause information related to the optimal set of item to be transmitted to the service provider computers 116 of FIG. 1.

Figure 4:
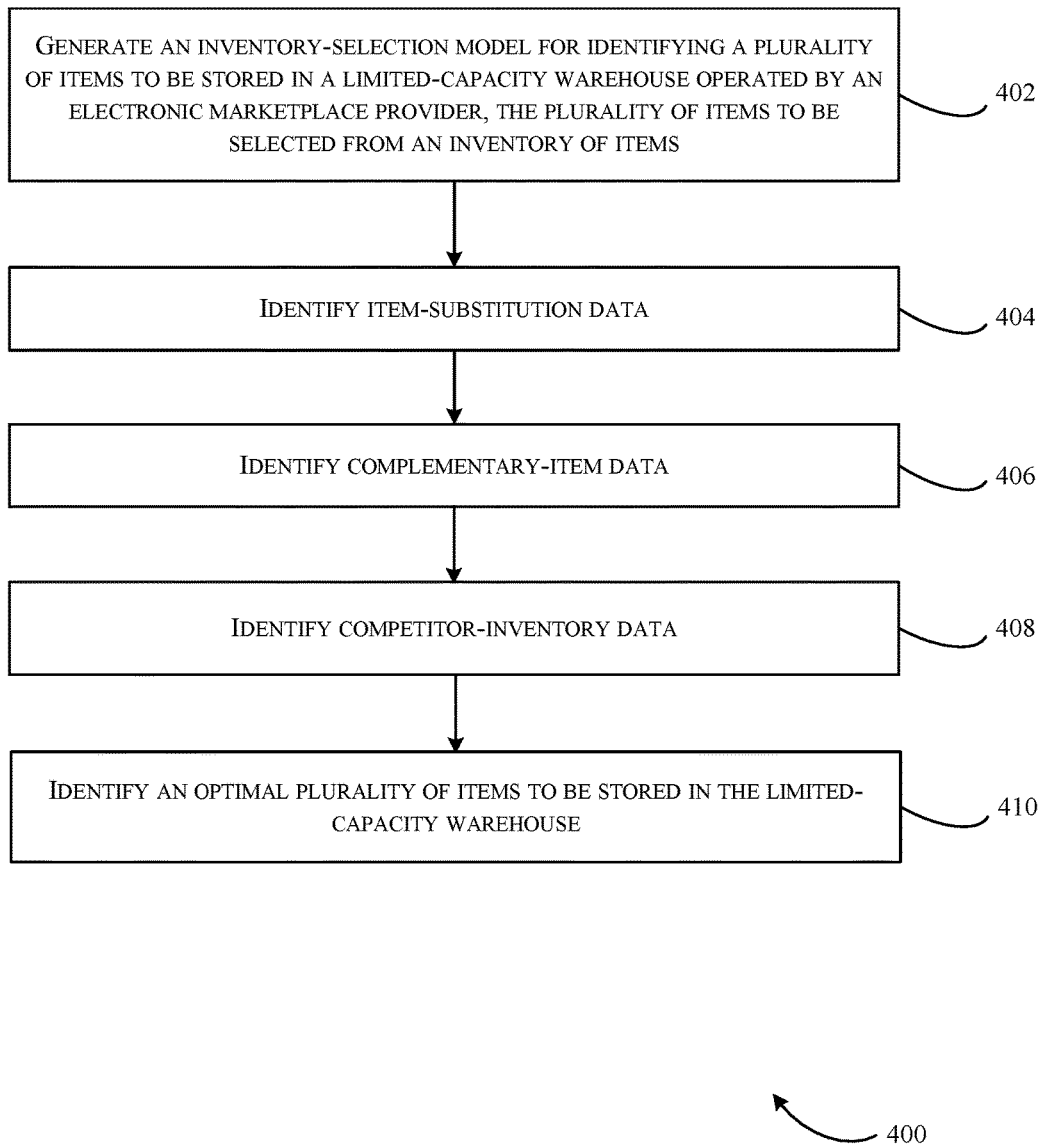
FIG. 4 is a flowchart illustrating an example method for generating an optimal set of items to be stored in a storage location, the method utilizing the inventory engine, in accordance with at least one embodiment.

FIG. 4 is a flowchart illustrating an example method 400 for generating an optimal set of items to be stored in a storage location (e.g., the micro-warehouse 106 of FIG. 1) utilizing the inventory engine 102 of FIG. 1, in accordance with at least one embodiment.

In at least one embodiment, the method 400 may begin at block 402, where an inventory-selection model may be generated for a plurality of items (e.g., by the selection engine 326 of FIG. 3). In at least one example, the plurality of items are to be stored in a limited-capacity warehouse (e.g., the micro-warehouse 106 of FIG. 1). The limited-capacity warehouse may be operated by an electronic marketplace provider. In at least one example the optimal plurality of items may be selected from an inventory of items (e.g., an inventory of items provided by the electronic marketplace provider) based at least in part on a storage constraint associated with the limited-capacity warehouse, an item category coverage constraint of the provider, and regional demand data associated with a geographical region serviced by the limited-capacity warehouse. The storage constraint may correspond to a capacity storage constraint or a time period by which items stored in the storage location are to be transported and provided to a purchaser (e.g., within two hours after purchase, within three hours after purchase, etc.). According to some embodiments, the regional demand data may be derived from a national demand forecast associated with a national geographical region.

At block 404, item-substitution data may be identified (e.g., by the selection engine 326 utilizing the inventory-selection model). The item-substitution data, in some examples, may indicate a first probability value corresponding to whether a plurality of users of the electronic marketplace will purchase a substitution item of the plurality of items when a desired item is excluded from the optimal plurality of items (e.g., is not offered).

At block 406, complementary-item data may be identified (e.g., by the selection engine 326 utilizing the inventory-selection model). The complementary-item data, in some examples, may indicate a second probability value corresponding to a statistical likelihood that including a complimentary item will increase a number of sales associated with at least one other item of the optimal plurality of items. For example, including flour as an item in inventory may be determined to potentially increase the number of sales associated milk and/or eggs.

At block 408, competitor-inventory data may be identified (e.g., by the selection engine 326 utilizing the inventory-selection model). The competitor-inventory data, in some examples, may indicate a third probability value corresponding that the plurality of users of the electronic marketplace will purchase an item offered by a competitor despite the item being included in the optimal plurality of items.

At block 410, an optimal plurality of items to be stored in the limited-capacity warehouse may be identified (e.g., by the selection engine 326 utilizing the inventory-selection model). In at least one example, the optimal plurality of items be may be identified based at least in part on the inventory-selection model, the item-substitution data (e.g., data related to a substitution item), the complimentary-item data (e.g., data related to a complementary item), and the competitor-inventory data (e.g., data related to a competitor-offered item). In at least one example, the optimal plurality of items may be further based at least in part on a priority associated with the plurality of items. According to some embodiments, the optimal plurality of items may be ranked (e.g., by the selection engine 326 utilizing the inventory-selection model) according to the priority and the score for the optimal plurality of items adjusted. The optimal plurality of items may be selected based on the adjusted (or unadjusted) score by, for example, the selection engine 326.

Figure 5:
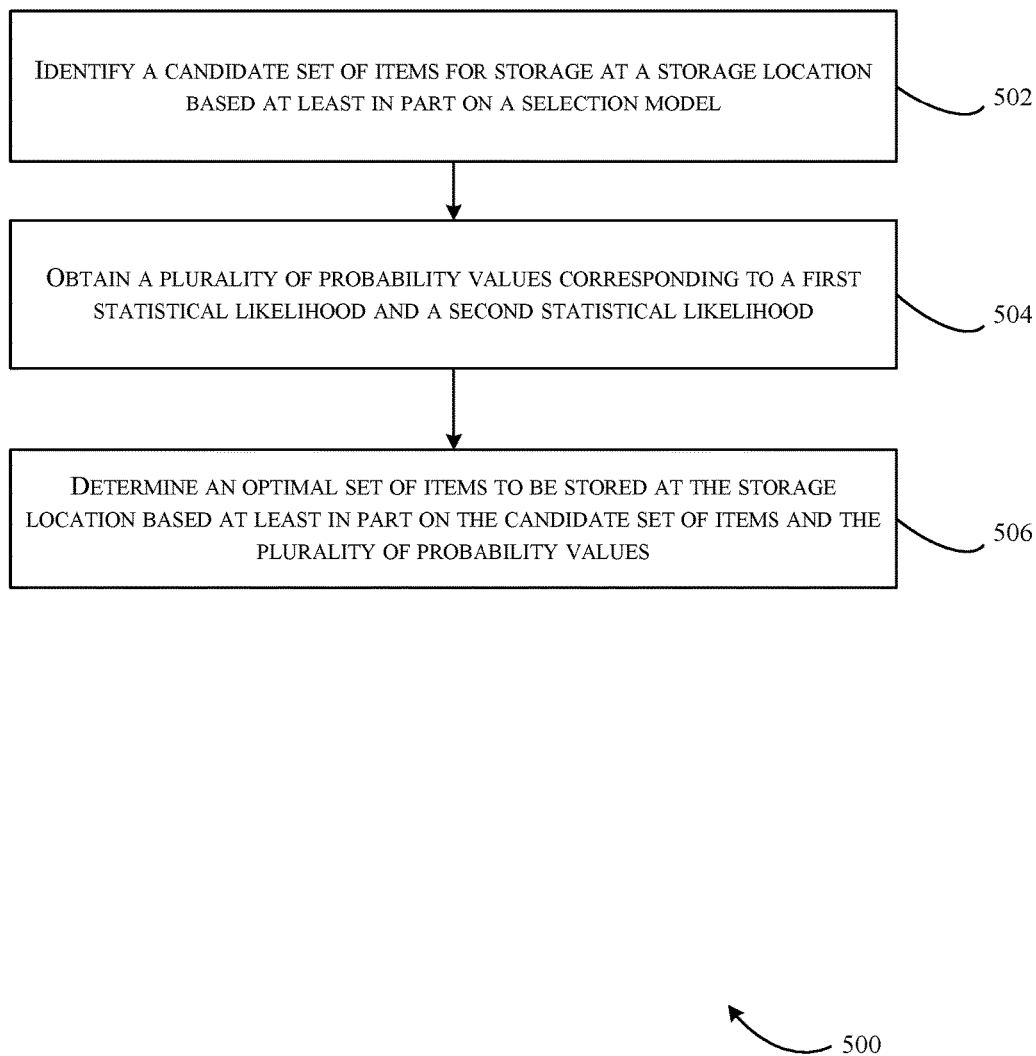
FIG. 5 is a flowchart illustrating another example method for generating an optimal inventory of items for a storage location, the method utilizing the inventory engine, in accordance with at least one embodiment.

FIG. 5 is a flowchart illustrating another example method 500 for generating an optimal inventory of items for a storage location (e.g., the micro-warehouse 106 of FIG. 1), the method utilizing the inventory engine 102 of FIG. 1, in accordance with at least one embodiment.

In at least one embodiment, the method 500 may begin at block 502, where a candidate set of items may be identified (e.g., by the selection engine 326 of FIG. 3). In at least one example, the plurality of items are to be selected for a storage location (e.g., the micro-warehouse 106 of FIG. 1) based at least in part on an inventory-selection model. In at least one example, the inventory-selection model may be based at least in part on a capacity of the storage location and a threshold time duration by which purchased items of the set of items are to be transported from the storage location to a purchaser. The inventory-selection model, in some cases, may be based at least in part on other storage constraints associated with the limited-capacity warehouse.

At block 504, a plurality of probability values corresponding to a first statistical likelihood and a second statistical likelihood may be obtained. The first statistical likelihood may correspond to whether a plurality of users of the electronic marketplace will purchase a substitution item of the plurality of items when a desired item is excluded from the optimal plurality of items. The second statistical likelihood may indicate that including a third item in the set of items will increase a number of sales associated with at least one other item of the set of items.

At block 506, an optimal plurality of items to be stored in the limited-capacity warehouse may be identified (e.g., by the selection engine 326 utilizing the inventory-selection model). In at least one example, the optimal plurality of items be may be identified based at least in part on the candidate set of items and the plurality of probability values.

Figure 6:
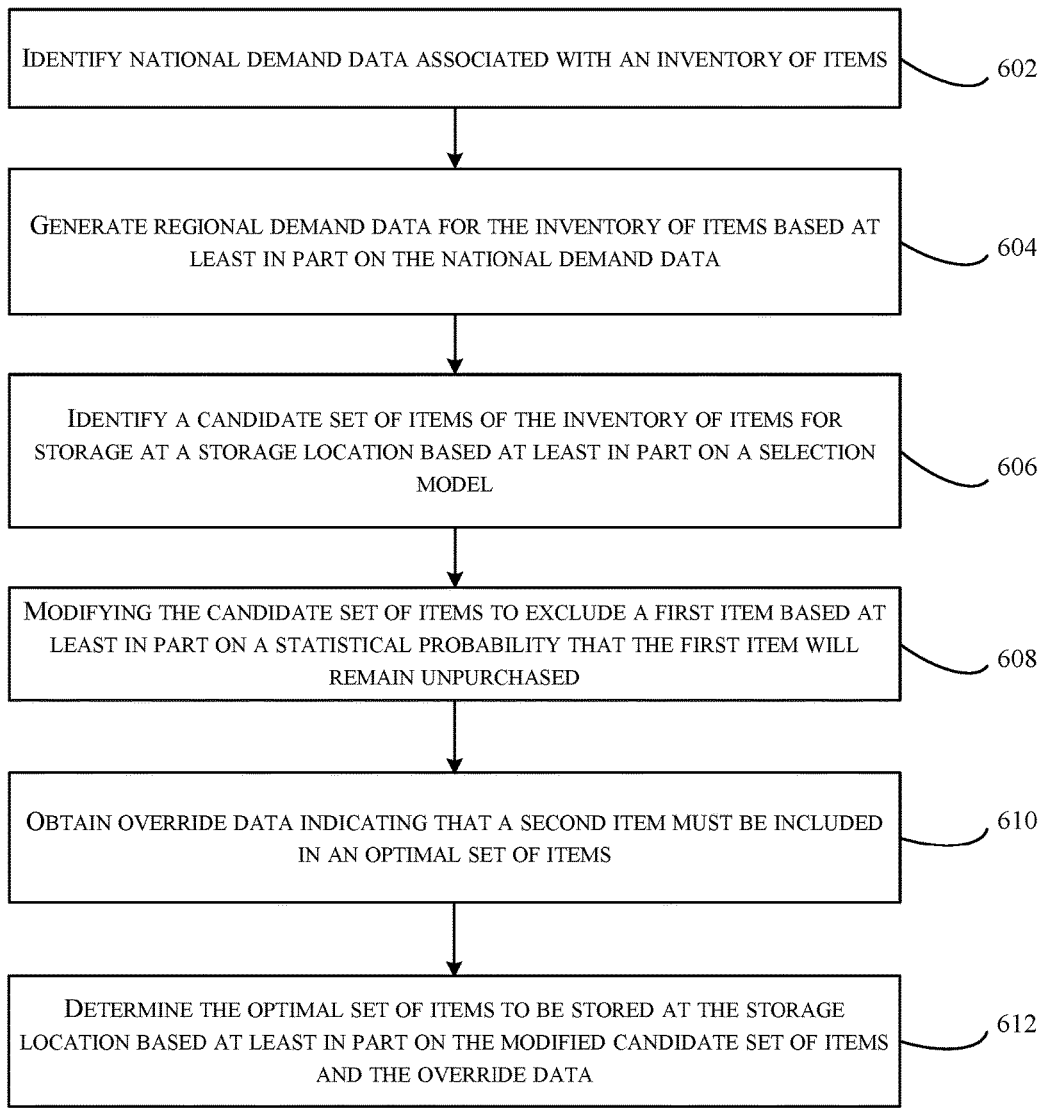
FIG. 6 is a flowchart illustrating a further example method for generating an optimal inventory of items for a storage location, the method utilizing the inventory engine, in accordance with at least one embodiment.

FIG. 6 is a flowchart illustrating a further example method 600 for generating an optimal inventory of items for a storage location (e.g., the micro-warehouse 106 of FIG. 1), the method utilizing the inventory engine 102 of FIG. 1, in accordance with at least one embodiment. The method 600 may begin at block 602 where national demand data may be associated with an inventory items.

At block 604, regional demand data for the inventory of items may be generated based at least in part on the national demand data. In some examples, the regional demand data may be associated with a region serviced by a storage location (e.g., a micro-warehouse).

At block 606, a candidate set of items of the inventory of items for storage at a storage location may be identified. The candidate set of items may be identified based at least in part on a selection model (e.g., an inventory-selection model described above with respect to FIG. 3). In some cases, the selection model may be based at least in part on a capacity of the storage location and the regional demand data.

At block 608, the candidate set of items may be modified to exclude a first item based at least in part on a statistical probability that the first item will remain unpurchased. In some examples, the statistical probability is unrelated with respect to the regional demand data.

At block 610, override data may be obtained that indicates that a second item must be included in the optimal set of items. Override data may be provided in one or more inclusion/exclusion list(s) specified in a predetermined list or provided via user-input.

At block 612, the optimal set of items to be stored at the storage location may be determined. In at least one example, determining the optimal set of items is based at least in part on the modified candidate set of items and the override data obtained at block 610.

Figure 7:
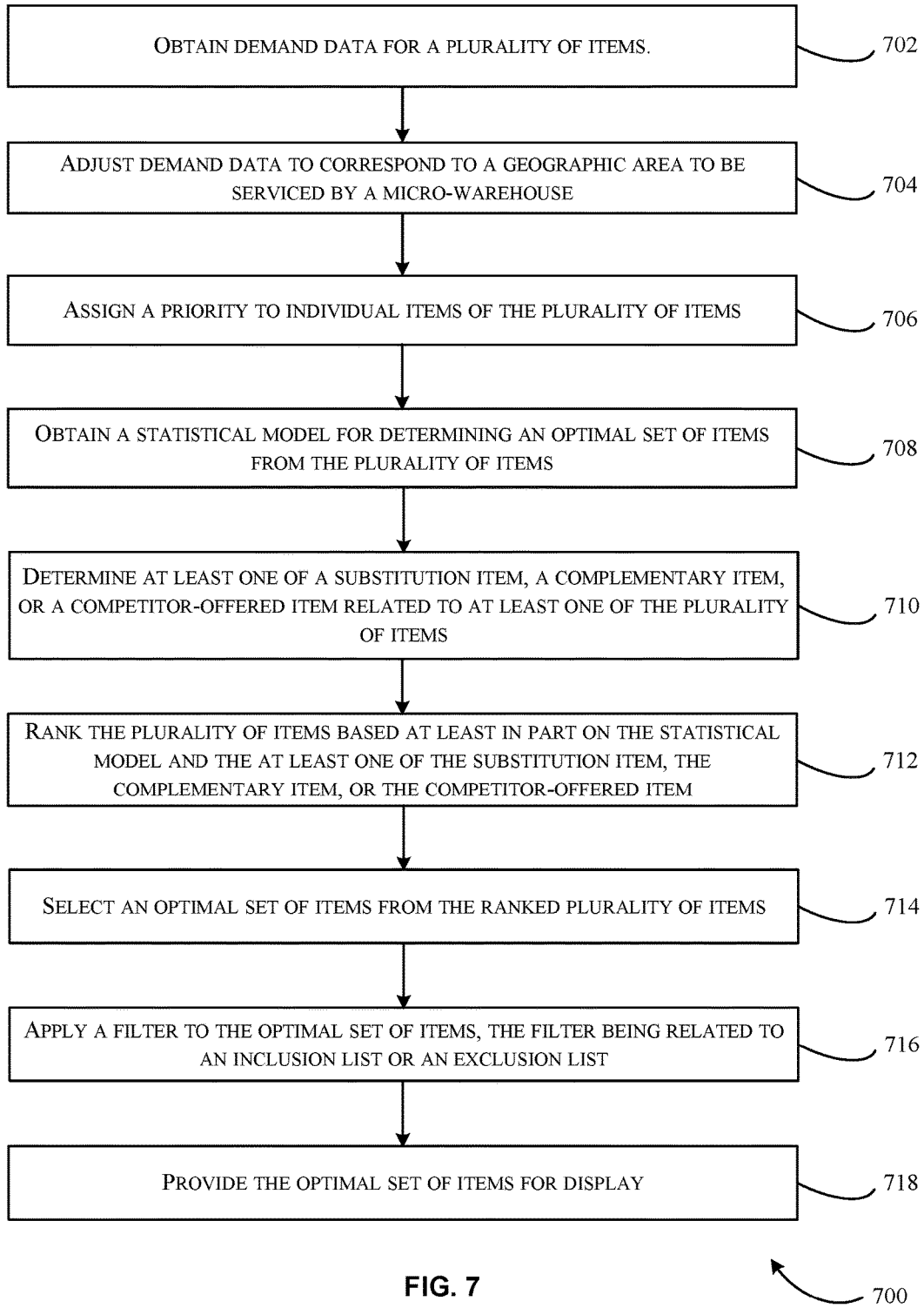
FIG. 7 is a flowchart illustrating still one further example method for generating an optimal inventory of items for a storage location, the method utilizing the inventory engine, in accordance with at least one embodiment.

FIG. 7 is a flowchart illustrating still one further example method 700 for generating an optimal inventory of items for a storage location (e.g., the micro-warehouse 106 of FIG. 1), the method utilizing the inventory engine 102 of FIG. 1, in accordance with at least one embodiment. The method 700 may being at block 702, where demand data may be obtained for a plurality of items (e.g., items in an inventory maintained by an electronic marketplace provider). The demand data may include a national forecast associated with the plurality of items and/or sales transaction information associated with the micro-warehouse 106 or another micro-warehouse of a network of warehouses.

At block 704, demand data may be adjusted (e.g., by the demand engine 320 of FIG. 3) to correspond to a geographic area to be serviced by a micro-warehouse. In one non-limiting example, the demand data may be scaled according to a population associated with the geographic area to be serviced by the micro-warehouse.

At block 706, a priority may be assigned to individual items of the plurality of items. The priority may be predetermined, user-specified, or derived (e.g., by the prioritization engine 324 of FIG. 3). The priority may, in some cases, cause a selection process to be biased according to the priority. For example, items having a high priority will receive a higher score than items with a lower priority regardless of demands associated with the respective items.

At block 708, a selection model (e.g., an inventory-selection model) may be obtained (e.g., by the selection engine 326 of FIG. 3). In at least one example, the selection model may be utilized for determining an optimal set of items from the plurality of items. The selection model may utilize any suitable combination of the formulas discussed above with respect to FIG. 3.

At block 710, at least one of a substitution item, a complementary item, or a competitor-offered item may be determined (e.g., by the selection engine 326). Each of the substitution item, the complementary item, or the competitor-offered item may be related to at least of the plurality of items.

At block 712, the plurality of items may be ranked (e.g., by the selection engine 326) based at least in part on the selection model (e.g., the inventory selection model). For example, the plurality of items may be ranked according to a score assigned according to a selection model. In at least one example, the score may be based at least in part on at least one of a substitution item, a complementary item, or the competitor-offered item.

At block 714, an optimal set of items may be selected from the ranked plurality of items (e.g., utilizing the selection model). In at least one example, the selection engine 326 may determine a maximum number of items to be stored in a micro-warehouse (e.g., determined from a storage constraint associated with the micro-warehouse and stored in the storage location data store 314 of FIG. 3).

At block 716, a filter may be applied to the optimal set of items (e.g., by the filtering engine 322 of FIG. 3). In at least one example, the filter being related to an inclusion list or an exclusion list. A filter that is related to an inclusion list may cause an item of the inclusion list to be added to the optimal set of items regardless of the scores associated with added item or the optimal set of items. In some cases, addition of an item of an inclusion list may cause one or more other items to be removed from the optimal set of items (e.g., one or more lowest-scored items, a set of items sharing a common attribute, etc.). A filter that is related to an exclusion list may cause an item of the exclusion list to be removed from the optimal set of items regardless of the score associated with the removed item. In some cases, removal of the item may cause one or more items to be added to the optimal set of items (e.g., the next-highest one or more items according to the scores).

At block 716, the optimal set of items may be provided for display (e.g., by the output manager 330 of FIG. 3). Additionally, or alternatively, the optimal set of items may be provided to, for example, the service provider computers 210 of FIG. 2. Providing the optimal set of items to the service provider computers 210 may cause the service provider computers 210, or another system, to execute one or more workflows that will cause the optimal set of items to be transported to the micro-warehouse for storage.

Figure 8:
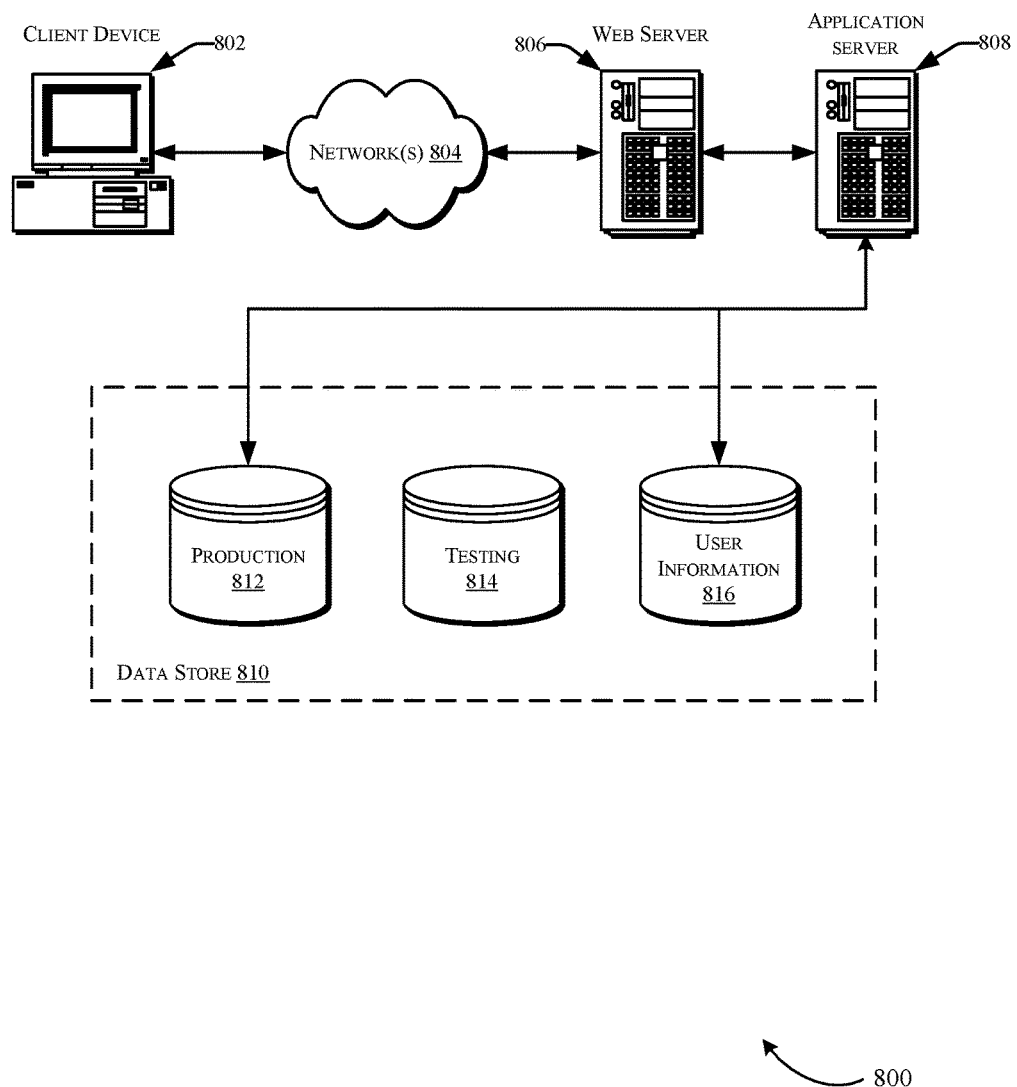
FIG. 8 is a schematic diagram illustrating an example environment for implementing aspects in accordance with at least one embodiment described herein.

FIG. 8 is a schematic diagram illustrating an example environment for implementing aspects in accordance with at least one embodiment described herein. As will be appreciated, although a Web-based environment is used for purposes of explanation, different environments may be used, as appropriate, to implement various embodiments. The environment includes a user device 802 (e.g., an electronic client device), which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 802 and the at least one application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the at least one application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating an inventory-selection mathematical model configured to select an optimal plurality of items to be stored in a limited-capacity warehouse operated by a provider of an electronic marketplace as part of a warehouse network that includes at least one larger warehouse, the optimal plurality of items to be selected from an inventory of items;
    obtaining a candidate set of items from which the optimal plurality of items are to be selected, the candidate set of items being selected based at least in part on regional demand data associated with a geographical region serviced by the limited-capacity warehouse;
    for each candidate item of the set of candidate items:
        calculating, utilizing the inventory-selection mathematical model, item-substitution data indicating a first probability value corresponding to whether a plurality of users of the electronic marketplace will purchase the candidate item instead of a desired item if the desired item is excluded from the optimal plurality of items;

calculating, utilizing the inventory-selection mathematical model, complementary-item data indicating a second probability value corresponding to a statistical likelihood that including the candidate item in the optimal plurality of items will increase a number of sales associated with at least one other item of the optimal plurality of items;

calculating, utilizing the inventory-selection mathematical model, competitor-inventory data indicating a third probability value corresponding to a likelihood that the plurality of users of the electronic marketplace will purchase an item offered by a competitor despite the candidate item being included in the optimal plurality of items; and calculating a score for the candidate item based at least in part on the regional demand data, the item-substitution data, the complementary-item data, and the competitor-inventory data; and selecting the optimal plurality of items to be stored in the limited-capacity warehouse based at least in part on the score for each candidate item.

2. The computer-implemented method of claim 1, wherein the regional demand data is derived from a national demand forecast associated with a national geographical region.

3. The computer-implemented method of claim 1, further comprising:

obtaining sales data related to items offered in another limited-capacity warehouse associated with a different geographic region;

adjusting the regional demand data based at least in part on the sales data;

adjusting the inventory-selection mathematical model based at least in part on the adjusted regional demand forecast; and identifying a new optimal plurality of items to be stored in the limited-capacity warehouse based at least in part on the adjusted inventory-selection mathematical model.

4. The computer-implemented method of claim 1, further comprising:

obtaining a priority list associated with the inventory of items; and ranking the inventory of items according to the regional demand data and the priority list, wherein the priority list biases the ranking to provide a higher rank for a first item in the priority list than a second item that is excluded from the priority list, the second item having a comparatively higher forecasted demand than a forecasted demand for the first item, wherein the optimal plurality of items is identified further based at least in part on the ranking.

5. The computer-implemented method of claim 1, further comprising calculating, for each candidate item of the plurality of candidate items, regional demand data for the candidate item with respect to the limited-capacity warehouse, the regional demand data indicating a number of predicted sales for an item related to a given time period within a geographical region, the regional demand data being calculated based at least in part on at least one national demand forecast for an item, the national demand forecast being associated with a larger area than the geographical region.

6. A computer-implemented method, comprising:

identifying a set of candidate items for storage at a storage location based at least in part on an inventory-selection mathematical model, the inventory-selection mathematical model being based at least in part on a capacity of the storage location and a threshold time duration by which purchased items of the set of candidate items are to be transported from the storage location to a purchaser;

for each candidate item of the set of candidate items:

calculating, utilizing the inventory-selection mathematical model, item-substitution data indicating a first probability value corresponding to whether a plurality of users will purchase the candidate item instead of a desired item if the desired item is not selected for an optimal set of items; and calculating, utilizing the inventory-selection mathematical model, a second probability value corresponding to a statistical likelihood that including the candidate item in the optimal set of items will increase a number of sales associated with at least one other item of the optimal set of items; and identifying an optimal set of items to be stored at the storage location based at least in part on the set of candidate items, the first probability value, the second probability value, and the inventory-selection mathematical model.

7. The computer-implemented method of claim 6, wherein the threshold time duration by which the purchased items are to be transported from the storage location to the purchaser is less than, or equal to, two hours.

8. The computer-implemented method of claim 6, wherein the inventory-selection mathematical model is further based at least in part on a plurality of business constraints, a particular business constraint of the plurality of business constraints specifying that items associated with a sub-category of a category of items cannot be included in the optimal set of items unless a representative item of each sub-category of the category of items is included in the optimal set of items.

9. The computer-implemented method of claim 6, wherein the inventory-selection mathematical model is further based at least in part on demand data associated with the set of candidate items, and wherein the demand data is determined based at least in part on purchase data related to the set of candidate items, the purchase data indicating that a user incurred higher shipping costs to obtain expedited delivery of a candidate item.

10. The computer-implemented method of claim 6, wherein determining the optimal set of items based at least in part on the first probability value and the second probability value causes an item to be included in the optimal set of items according to the second probability value.

11. The computer-implemented method of claim 6, further comprising, for each candidate item in the set of candidate items:

calculating, utilizing the inventory-selection mathematical model, a third probability value indicating a likelihood that the plurality of users will purchase an item provided by a third-party instead of a fourth item included in the candidate set of items, wherein the optimal set of items is identified further based at least in part on the third probability value.

12. A system, comprising:
one or more processors; and
one or more memories storing computer-executable instructions, the computer-executable instructions, when executed with the one or more processors, causing the system to, at least:
identify national demand data associated with an inventory of items of an electronic marketplace;
generate regional demand data for the inventory of items based at least in part on the national demand data, the regional demand data being associated with a region serviced by a storage location;
identify a candidate set of items of the inventory of items for storage at the storage location based at least in part on an inventory-selection mathematical model, the inventory-selection mathematical model being based at least in part on a capacity of the storage location and the regional demand data;
for each candidate item of the set of candidate items:
calculate, utilizing the inventory-selection mathematical model, item-substitution data indicating a first probability value corresponding to whether a plurality of users will purchase the candidate item instead of a desired item if the desired item is excluded from an optimal plurality of items; and
calculate, utilizing the inventory-selection mathematical model, a second probability value corresponding to a statistical likelihood that including the candidate item in the optimal plurality of items will increase a number of sales associated with at least one other item of the optimal plurality of items;
obtain, utilizing the inventory-selection mathematical model, a set of items, the set of items being identified by the inventory-selection mathematical model based at least in part on the first probability value and the second probability value for each of the set of candidate items;
obtain override data indicating that a second item must be included in an optimal set of items; and
determine the optimal set of items to be stored at the storage location based at least in part on the obtained set of items and the override data.

13. The system of claim 12, wherein the instructions that calculate the second probability value, include further instructions that, when executed, cause the system to, at least:
determine a relationship between a first item and second item of the inventory of items;
determine a frequency that the first item is purchased with the second item;
determine that the second item is excluded from the set of candidate items;
calculate the second probability value based at least in part on the relationship between the first item and the second item, the frequency that the first item is purchased with the second item, and the determination that the second item is excluded from the candidate set of items.

14. The system of claim 12, wherein the instructions include further instructions that, when executed, cause the system to, at least, exclude items from the inventory of items that a provider is incapable of delivering with a threshold time duration.

15. The system of claim 12, wherein the instructions include further instructions that, when executed, cause the system to, at least, adjust the regional demand data based at least in part on demand data associated with a same region or a different region, wherein the demand data associated with the same region or the different region conflicts with the national demand data.

16. The system of claim 12, wherein the national demand data is associated with sales data related to a first population of users, and wherein the regional demand data is generated by scaling the sales data according to a second population of users, the second population of users being associated with the region serviced by the storage location.

17. The system of claim 12, wherein the national demand data is identified based at least in part a start date associated with a date on which the set of candidate items are scheduled to be provided by the storage location.

18. The system of claim 12, wherein the instructions include further instructions that, when executed, cause the system to, at least:
identify a first list of items to be included in the optimal set of items and a second list of items to be excluded from the optimal set of items, wherein the optimal set of items is modified to include items specified in the first list of items and exclude items specified in the second list of items.

19. The system of claim 18, wherein the instructions that identify the first list, include further instructions that, when executed, cause the system to, at least:
determine a period of time during which an item has been available for consumption on the electronic marketplace;
determine that the item has been purchased over a threshold amount during the period of time; and
add the item to the first list based at least in part on the determination that the item has been purchased over the threshold amount during the period of time.

20. The system of claim 18, wherein the instructions that identify the second list of items to be excluded from the optimal set of items include further instructions that, when executed, cause the system to, at least:
determine that a period of time during which an item has been available for consumption on the electronic marketplace exceeds a threshold period of time;
determine that the item has not been purchased over a threshold amount during the period of time; and
add the item to the second list based at least in part on the determination that the period of time during which the item has been available exceeds the threshold period of time and the determination that the item has not been purchased within the period of time.

* * * * *